(12) United States Patent
Hsu et al.

(10) Patent No.: US 10,775,203 B2
(45) Date of Patent: Sep. 15, 2020

(54) OPTICAL ENCODER AND METHOD OF OPERATING THE SAME FOR CONVERTING IMAGE OF A PORTION OF A PATTERN OF CODES INTO WAVEFORMS

(71) Applicant: AEOLUS ROBOTICS CORPORATION LIMITED, Hong Kong (HK)

(72) Inventors: Yueh Teng Hsu, Taipei (TW); Lin Wu, Taipei (TW)

(73) Assignee: AEOLUS ROBOTICS CORPORATION LIMITED, Wanchai (HK)

( * ) Notice: Subject to any disclaimer, the term of this patent is extended or adjusted under 35 U.S.C. 154(b) by 179 days.

(21) Appl. No.: 16/104,770

(22) Filed: Aug. 17, 2018

(65) Prior Publication Data

US 2020/0056906 A1 Feb. 20, 2020

(51) Int. Cl.
*G01D 5/347* (2006.01)

(52) U.S. Cl.
CPC ..... *G01D 5/34776* (2013.01); *G01D 5/34715* (2013.01)

(58) Field of Classification Search
CPC ........... G01D 5/34715; G01D 5/34776; G01D 5/2497; G01D 5/34707; G01D 5/3473
USPC ................................ 250/231.13, 214 R, 239
See application file for complete search history.

(56) References Cited

U.S. PATENT DOCUMENTS 5,012,238 A * 4/1991 Hayashi ............... G01D 5/2455
341/11

* cited by examiner

*Primary Examiner* — Que Tan Le
(74) *Attorney, Agent, or Firm* — Fenwick & West LLP (57) ABSTRACT

A code plate including a pattern thereon is provided. The pattern includes a first set of codes and a second set of codes. The first set of codes is associated with a first waveform. The second set of codes is associated with a second waveform.

21 Claims, 7 Drawing Sheets

OPTICAL ENCODER AND METHOD OF OPERATING THE SAME FOR CONVERTING IMAGE OF A PORTION OF A PATTERN OF CODES INTO WAVEFORMS

BACKGROUND

1. Technical Field

The present disclosure relates generally to an apparatus and a method for detecting the position and motion thereof using sensor devices, and more specifically to an apparatus and a method for detecting the position and motion thereof using optical encoder sensors.

2. Description of the Related Art

Optical encoders are useful in many applications. For example, an absolute encoder can be used to determine the position, motion or angle of an object by transforming a physical position into an electrical signal corresponding to such position. In a comparative rotation mechanism (e.g., a robotic arm), an absolute encoder includes a sensor (or a camera) to read or detect predetermined patterns (e.g., a barcode) formed on a code plate and to generate a signal indicating the absolute position of the rotation mechanism. However, due to the ageing or deterioration of the absolute encoder, the distance between the code plate and the sensor may vary, which would cause an aberration or distortion (e.g., defocus or blurring) of captured images. This would adversely affect the accuracy of the position, motion or angle detected by the absolute encoder.

SUMMARY

In one or more embodiments, a code plate including a pattern thereon is provided. The pattern includes a first set of codes and a second set of codes. The first set of codes is associated with a first waveform. The second set of codes is associated with a second waveform.

In one or more embodiments, an encoder includes a plate, a sensor and a processor. The plate including a pattern thereon. The sensor is configured to obtain an image of a portion of the pattern. The processor is configured to convert the image obtained by the sensor into at least two waveforms.

In one or more embodiments, a method for determining a position of an object includes (a) obtaining an image on a code plate connected to the object; (b) converting the image obtained by the sensor into at least two waveforms; (c) determining phase information of the waveforms; and (d) determining the position of the object based on the phase information.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Structures, manufacturing and use of the embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings are disclosed below using specific language. It will nevertheless be understood that the embodiments or examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

Figure 1:
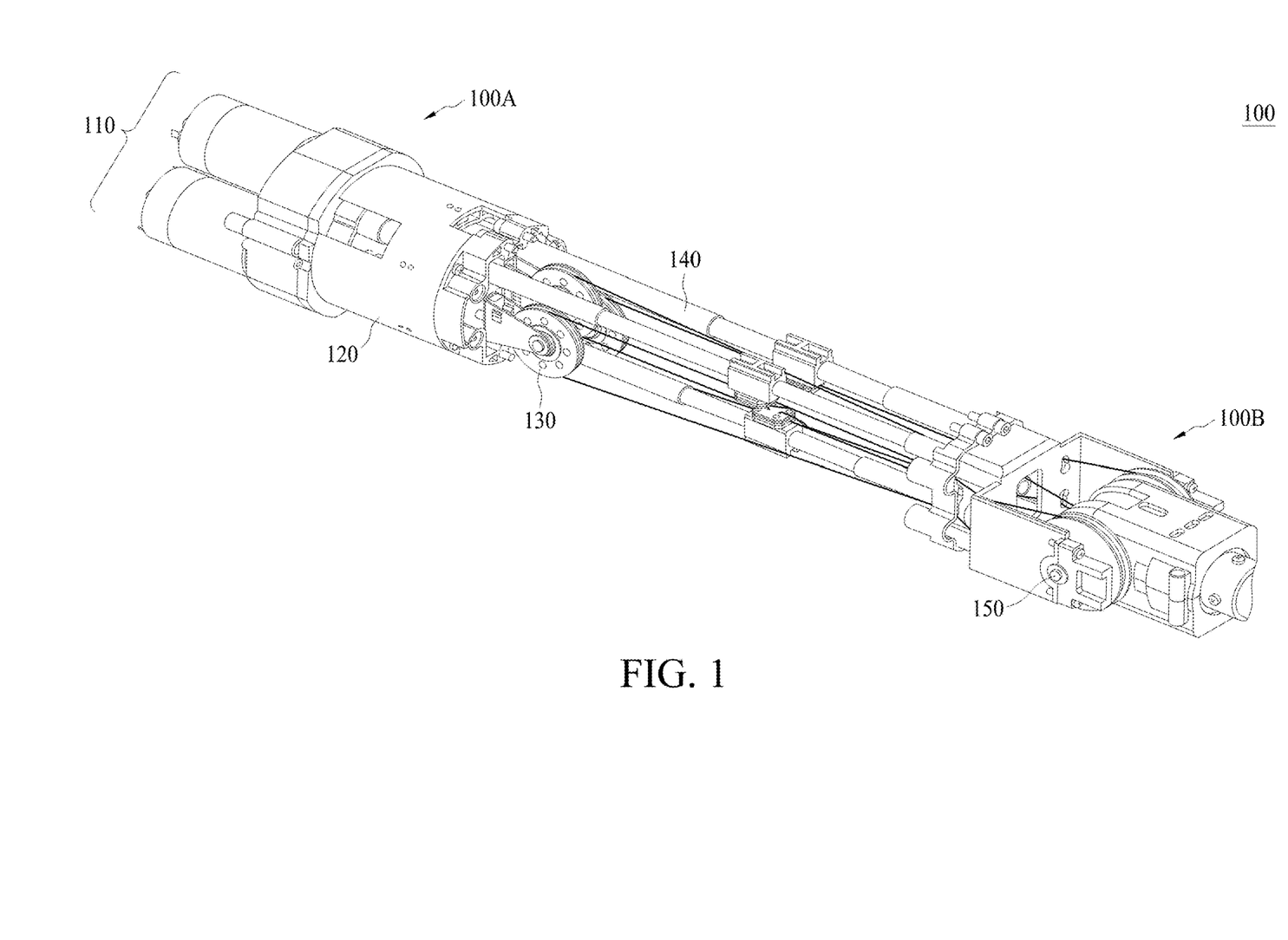
FIG. 1 illustrates a perspective view of a rotatable mechanism in accordance with some embodiments of the present disclosure.

FIG. 1 illustrates a perspective view of a rotatable mechanism 100 in accordance with some embodiments of the present disclosure. In some embodiments, the rotatable mechanism 100 is a robotic arm or a portion of a robotic arm. The rotatable mechanism 100 includes a first end portion 100A and a second end portion 100B opposite the first end portion 100A. The rotatable mechanism 100 further includes motors 110, a gear reducer 120, a drive plate 130, a screw rod 140 and a joint 150.

The gear reducer 120 is connected to the first end portion 100A of the rotatable mechanism 100 and mounted to the motors 110 to shift the rotational speed of the motors 110. The motors 110 and the gear reducer 120 provide multiple different drivers for the rotatable mechanism 100. The drive plate 130 is rotatably mounted to the first end portion 100A of the rotatable mechanism 100. The screw rod 140 is connected to the first end portion 100A of the rotatable mechanism 100 with the second end portion 100B of the rotatable mechanism 100 to drive the joint 150 to rotate or move using the power generated by the motors 110.

Figure 2A:
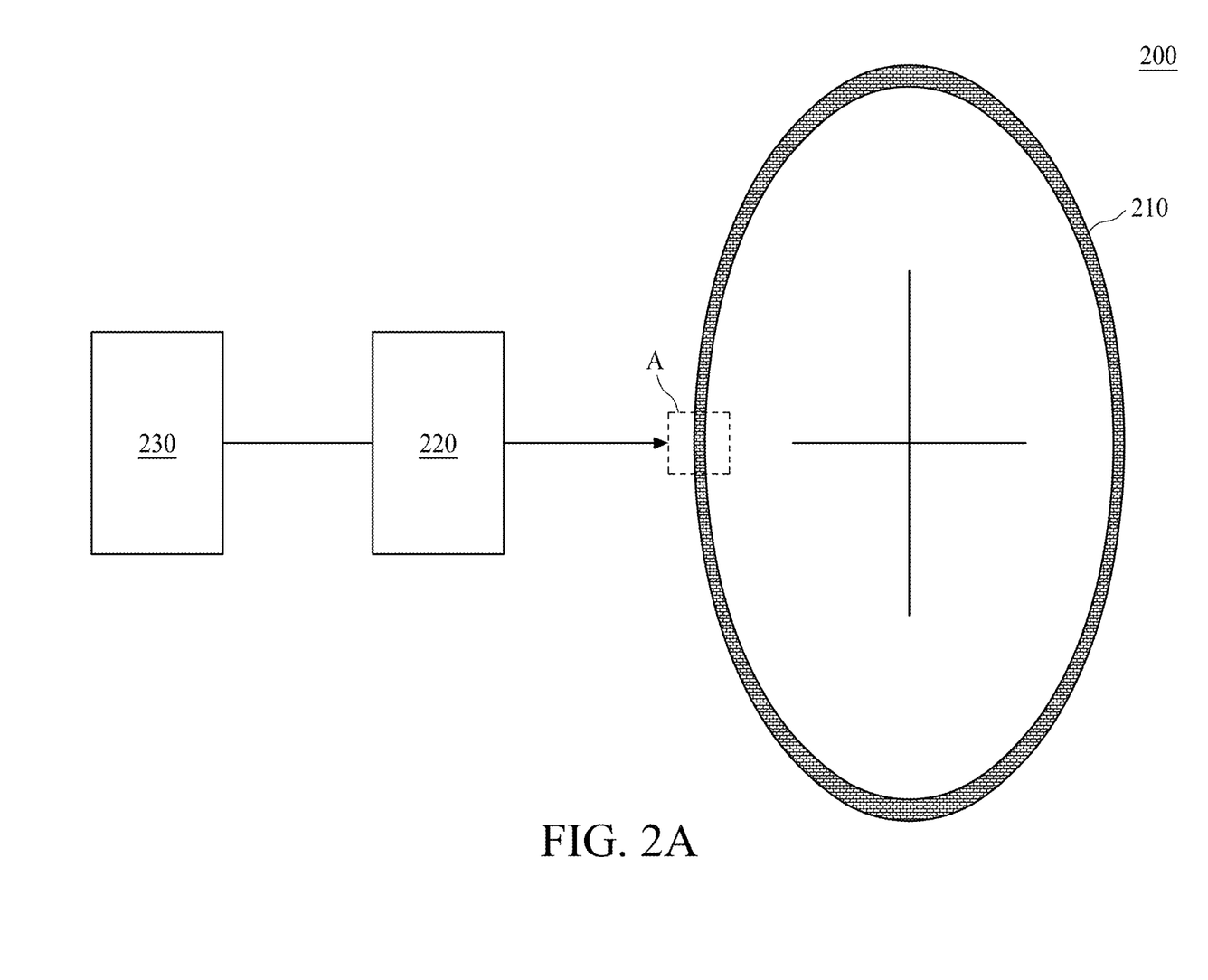
FIG. 2A illustrates a perspective view of an optical encoder in accordance with some embodiments of the present disclosure.

FIG. 2A illustrates a perspective view of an optical encoder 200 in some embodiments of the present disclosure. In some embodiments, the optical encoder 200 is an absolute encoder and can be disposed at the second end portion 100B of the rotatable mechanism 100 in FIG. 1. For example, the optical encoder 200 can be connected to or adjacent to the joint 150 of the rotatable mechanism 100 in FIG. 1. Alternatively, the optical encoder 200 can be connected to any other objects, devices or mechanisms to detect an angle, a motion and/or a position thereof. The optical encoder 200 includes a disc (which can also be referred to as a "code plate") 210, a sensor 220 and a processor 230.

Figure 2B:
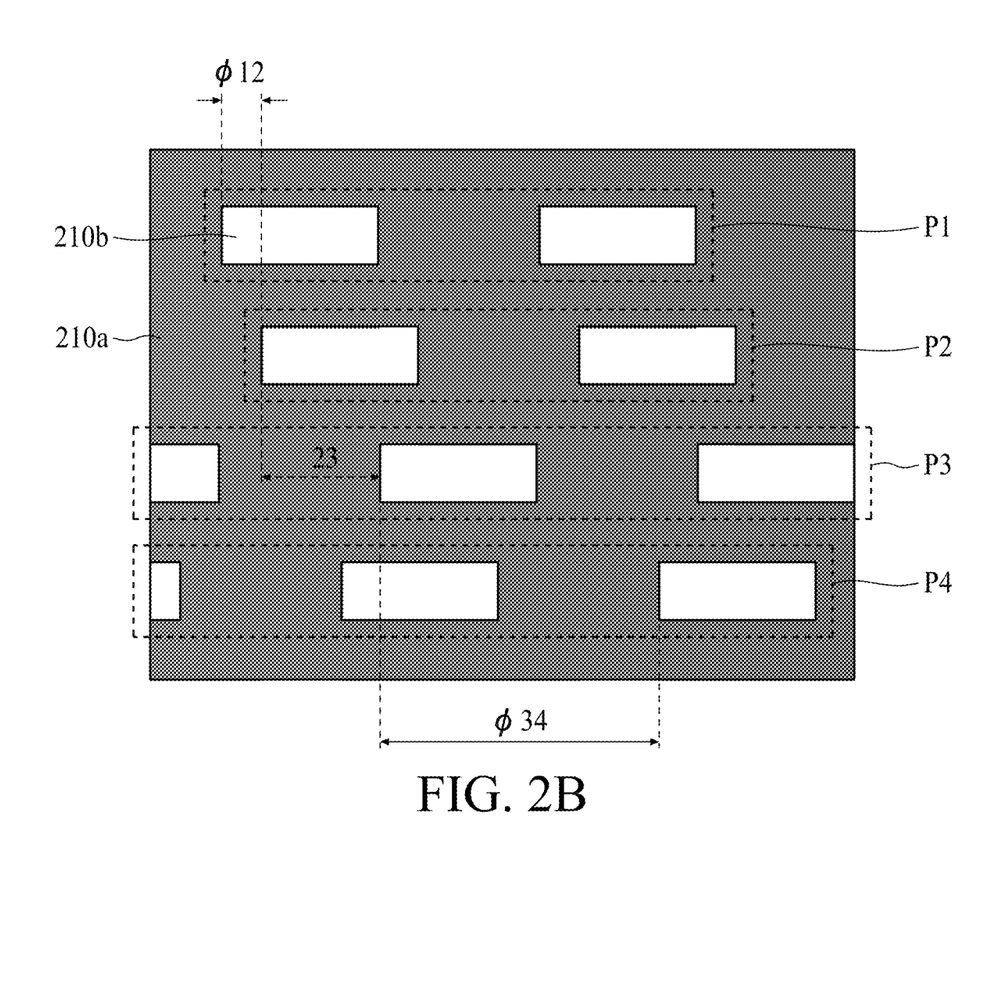
FIG. 2B illustrates an enlarged view of a portion of a pattern on a disc in accordance with some embodiments of the present disclosure.

The disc 210 is disposed adjacent to the sensor 220. The disc 210 includes a predetermined pattern thereon. In some embodiments, as shown in FIG. 2B, which illustrates an enlarged view of a portion of the pattern on the disc 210 in FIG. 2A circled by a dotted-line square A, the pattern includes a series of black portions 210a and white portions 210b. In some embodiments, the disc 210 can be replaced by a plate, a frame, a rod or any other suitable objects with patterns thereon.

The sensor 220 is configured to obtain a portion of the pattern on the disc 210 and to send the obtained image to the processor 230. For example, if the disc 210 rotates so that a portion of the pattern circled by the dotted-line square A is located at a capture region of the sensor 220, the image of the portion of the pattern circled by the dotted-line square A is obtained or captured by the sensor 220. Therefore, the image of the pattern obtained by the sensor 220 varies as the disc 210 rotates. In some embodiments, the sensor 220 may include a camera or an optical mouse to obtain images of different portions of the pattern on the disc 210.

In some embodiments, the image in FIG. 2B is a portion of the pattern captured by the sensor 220. The image in FIG. 2B includes four sets of codes P1, P2, P3 and P4. In other embodiments, the image captured by the sensor 220 may include any number of sets of codes depending on different design requirements. For example, the image captured by the sensor 220 may include N sets of codes, where N is an integer greater than 1. Each of the four sets of codes P1, P2, P3 and P4 in FIG. 2B includes block portions 210a and white portions 210b, wherein two adjacent white portions 210b are separated by a block portion 210a. In some embodiments, the width of each block portion 210a is substantially the same as the width of each white portion 210b. In some embodiments, the block portion 210a may represent a logical value (e.g., "1" or "0"), while the white portion 210b may represent an opposite logical value.

In some embodiments, as shown in FIG. 2B, any two adjacent sets of codes have a phase difference. For example, the phase difference φ12 between the set of the codes P1 and the set of codes P2 is about 45 degrees, the phase difference φ23 between the set of the codes P2 and the set of codes P3 is about 135 degrees, and the phase difference φ34 between the set of the codes P3 and the set of codes P4 is about 315 degrees. The phase difference between any two of the sets of codes can be changed depending on different embodiments.

Referring to FIG. 2A, the processor 230 is configured to receive the obtained image from the sensor 220 and to determine the angle and/or position of the rotatable mechanism 100 in FIG. 1. In some embodiments, the angle and/or position of the rotatable mechanism 100 in FIG. 1 are determined based on the phase difference between two adjacent sets of codes in the captured image.

Figure 3A:
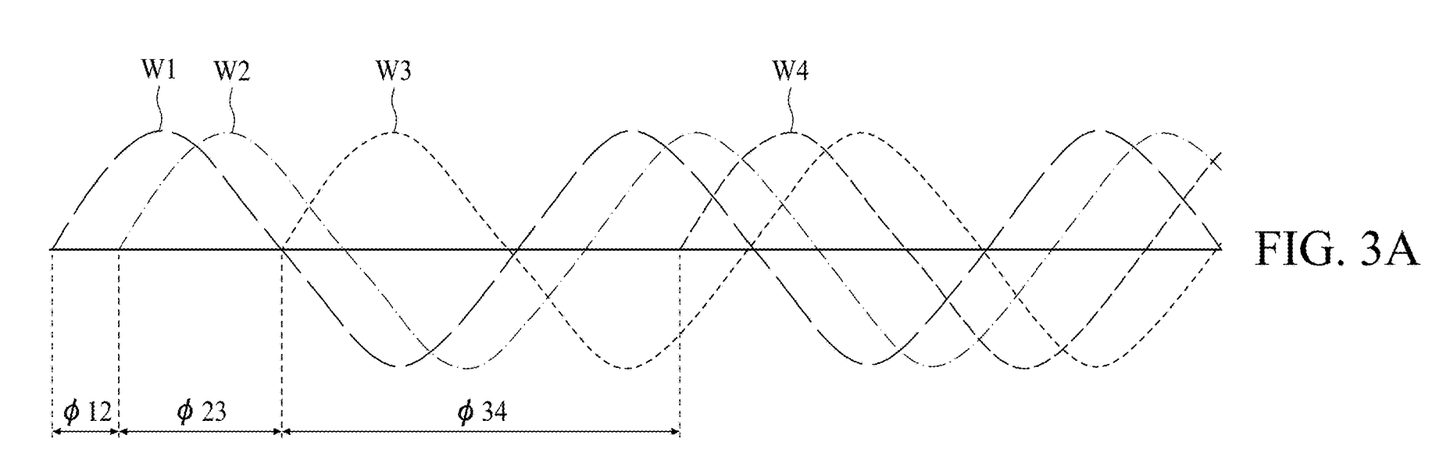
FIG. 3A and FIG. 3B illustrate waveforms corresponding to the portion of the pattern shown in FIG. 2B in accordance with some embodiments of the present disclosure.

In some embodiments, take the image illustrated in FIG. 2B as an example, the processor 230 is configured to convert four sets of codes P1, P2, P3 and P4 into the corresponding waveforms W1, W2, W3 and W4 (e.g., sine waves or cosine waves) as shown in FIG. 3A. In some embodiments, the conversion is carried out using, for example, Fast Fourier Transform (FFT) or any other suitable algorithm. After four sets of codes P1, P2, P3 and P4 are converted into the corresponding waveforms W1, W2, W3 and W4, the processor 230 is configured to determine the phase difference φ12, φ23 or φ34 between two waveforms (e.g., W1 and W2, W2 and W3 or W3 and W4) corresponding two adjacent sets of codes (e.g., P1 and P2, P2 and P3 or P3 and P4). In some embodiments, the phase difference φ12 between the waveform W1 and the waveform W2 is about 45 degrees, the phase difference φ23 between the waveform W2 and the waveform W3 is about 135 degrees, and the phase difference φ34 between the waveform W3 and the waveform W4 is about 315 degrees.

The processor 230 is then configured to convert the phase differences φ12, φ23 and φ34 into a series of numerals or any other kinds of codes. In some embodiments, a phase difference can be converted into a corresponding numeral based on the following equation: N=P/45, where P is the phase difference and N is the corresponding numeral. For example, the phase difference of 45 degrees can be converted into the numeral "1," the phase difference of 135 degrees can be converted into the numeral "3," and the phase difference of 315 degrees can be converted into the numeral "7." Thus, the image captured by the sensor 220 as shown in FIG. 2B can be converted into a series of numerals including "1," "3" and "7" (or the numeral "137"). In other embodiments, a phase difference can be converted into a corresponding numeral based on the following equation: N=P/M, where P is the phase difference, N is the corresponding numeral and M is an integer greater than 0 depending on different design requirements.

The processor 230 is then configured to determine the angle and/or position of the rotatable mechanism 100 in FIG. 1 based on the numeral "137" by referring to a conversion table. In some embodiments, the processor 230 may include or is connected to a memory (e.g., RAM, flash memory and the like) configured to store the conversion table showing the relationship between a series of numerals and the corresponding angles and/or positions of the rotatable mechanism 100.

In other embodiments, the processor 230 is configured to directly convert the phase information (e.g., the absolute phase) of the waveforms W1, W2, W3 and W4 into a series of numerals or any other kinds of codes, and then to determine the angle and/or position of the rotatable mechanism 100 in FIG. 1 based on the numerals by referring to the conversion table.

Figure 3B:
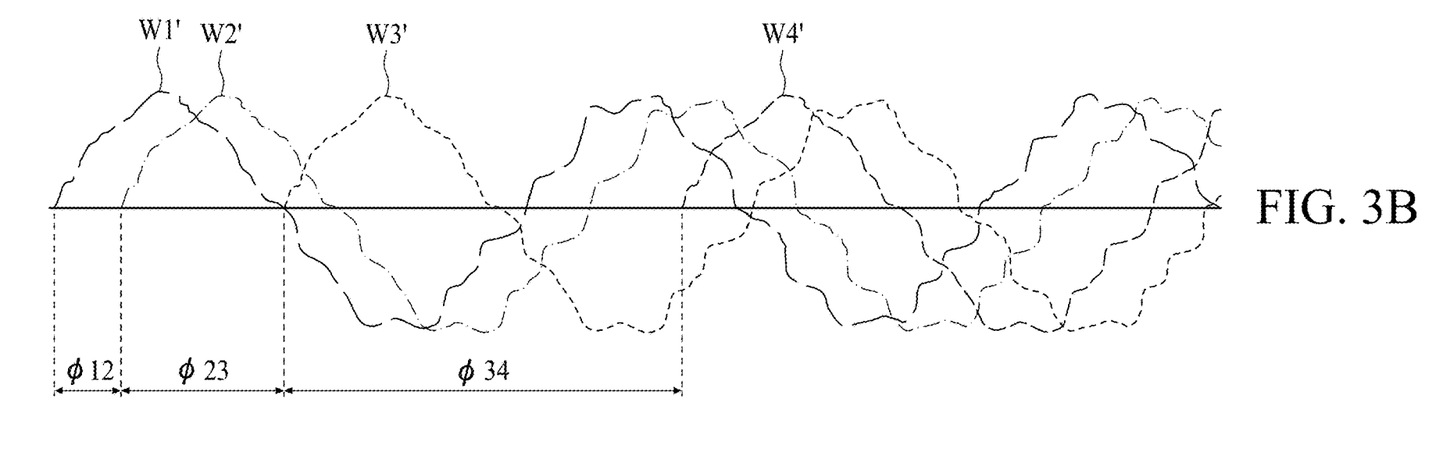

In some existing absolute encoders, the code plate has a barcode thereon and a camera of the absolute encoder is configured to capture an image showing a portion of the barcode and then to compare the captured image with the images stored in a memory of the absolute encoder to determine the corresponding position or angle of a rotatable mechanism. However, due to the ageing or deterioration of the absolute encoder, the distance between the code plate and the sensor may vary, which would cause an aberration or distortion (e.g., defocus or blurring) of captured images. This would adversely affect the accuracy of the position, motion or angle detected by the absolute encoder. In accordance with the embodiments in FIG. 2A and FIG. 2B of the present disclosure, by converting a portion of the pattern on the disc 210 captured by the sensor 220 into a series of waveforms and determining the position, motion and/or angle of the rotatable mechanism based on the phase differences of the waveforms, the aberration or distortion (e.g., defocus or blurring) of captured images has less influence on the determination of the position, motion and/or angle of the rotatable mechanism. For example, if a defocused or blurred image is captured by the sensor 220, the pattern of the captured image can be converted into a series of waveforms W1', W2', W3' and W4' as shown in FIG. 3B, in which each waveform is distorted due to the noise. The distorted waveforms W1', W2', W3' and W4' in FIG. 3B can be compensated to become the waveforms in FIG. 3A by canceling or reducing the noise of each waveform, which would increase the accuracy of the position, motion or angle detected by the optical encoder 200 without increasing the number of pixels or resolution of the code plate.

In addition, since the memory of the optical encoder 200 in FIG. 2A is configured to store only a conversion table showing the relationship between a series of numerals and the corresponding angles and/or positions of the rotatable mechanism 100, the requirement for the storage space of the memory of the optical encoder 200 is much less compared to the existing absolute encoder in which the memory is configured to store a plurality of images.

Figure 4A:
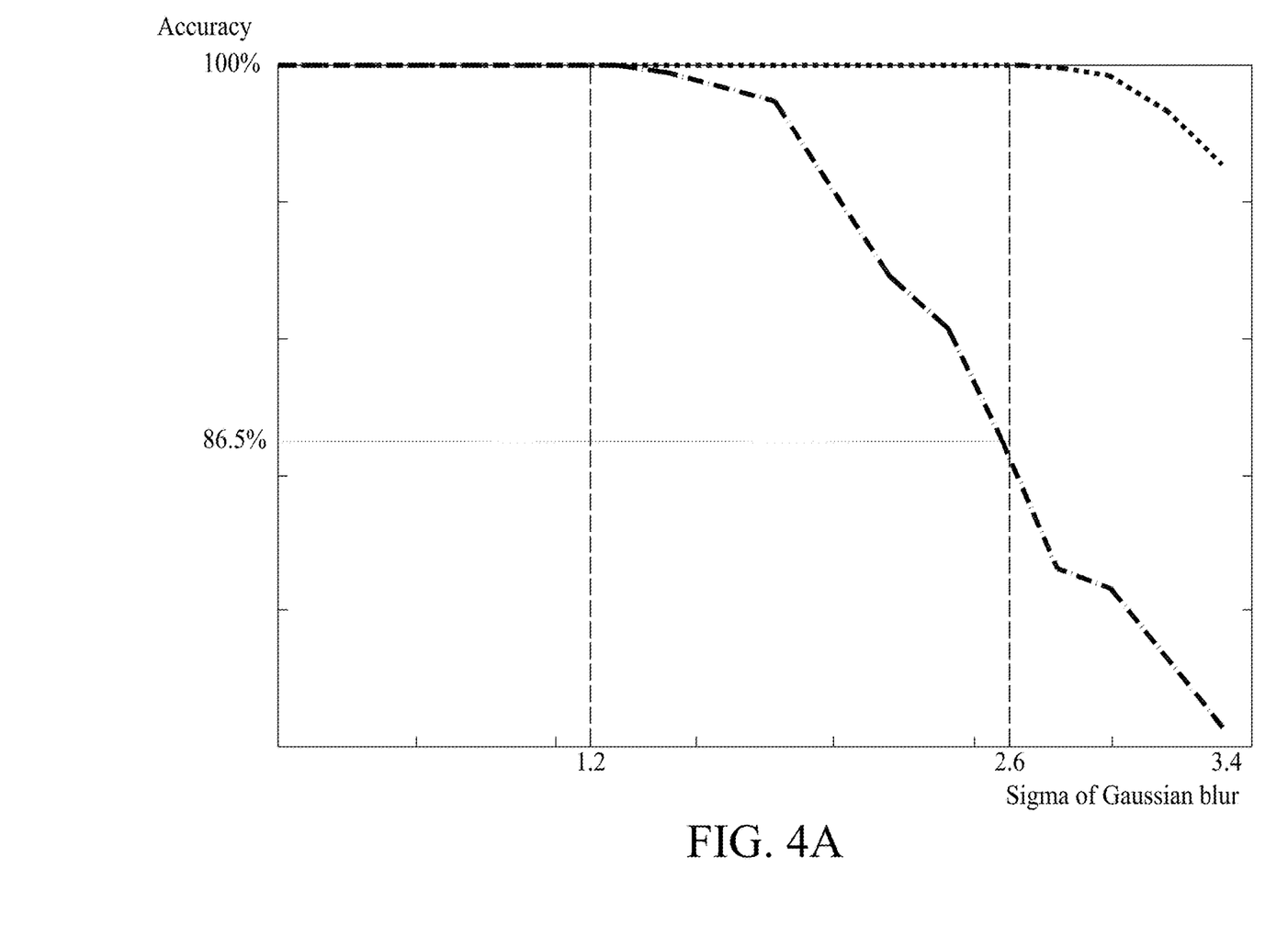
FIG. 4A and FIG. 4B illustrate simulation results in accordance with some embodiments of the present disclosure.

FIG. 4A illustrates simulation results of the existing absolute encoder (which determines the position or angle of an object directly based on the captured image) and the optical encoder 200 (which determines the position or angle of an object based on the phase differences between the waveforms converted from the captured image) in accordance with some embodiments of the present disclosure. In FIG. 4A, a dotted curve L1 shows the simulation result of the optical encoder 200 while a dashed curve L2 shows the simulation result of the existing absolute encoder. As shown in FIG. 4A, when the sigma of the Gaussian blur increases to 2.6, the accuracy of the optical encoder 200 remains at 100% but the accuracy of the existing absolute encoder drops to 85.5%.

Figure 4B:
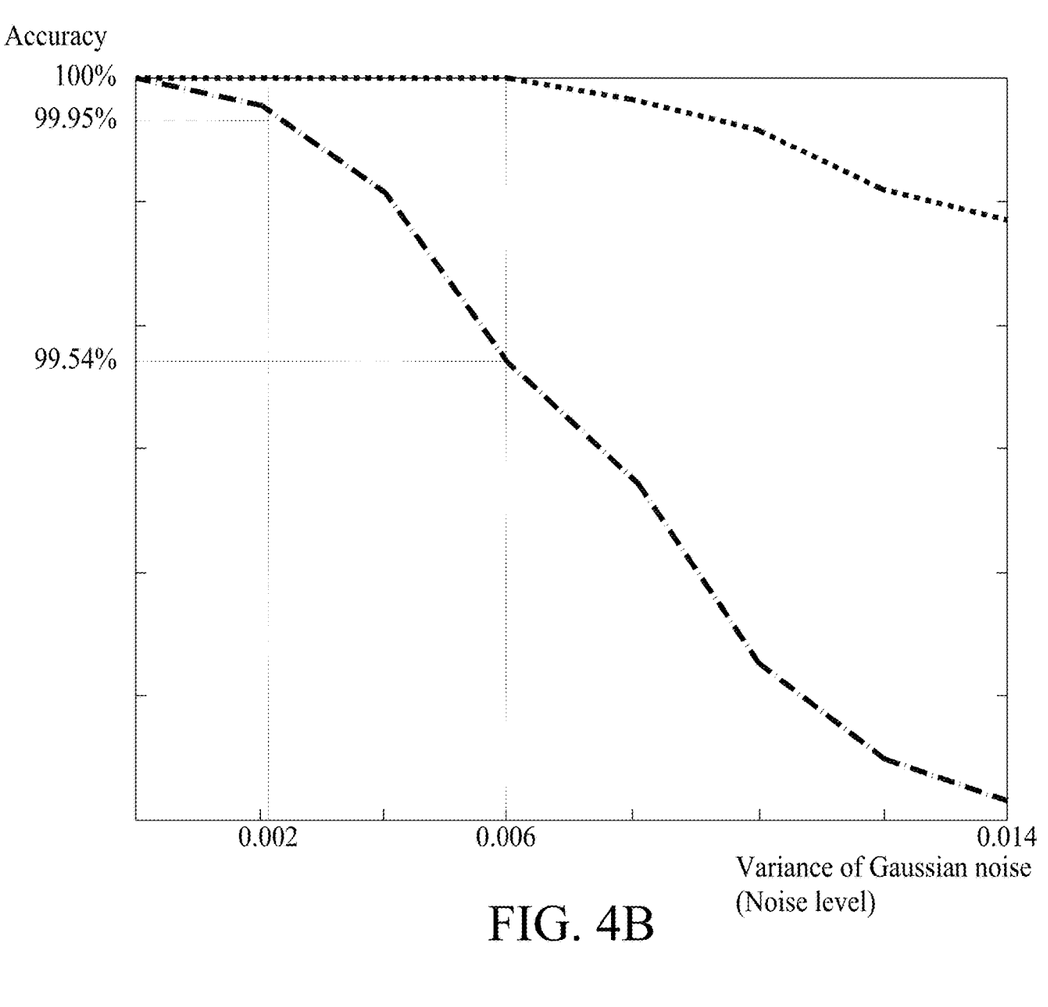

FIG. 4B illustrates simulation results of the existing absolute encoder (which determines the position or angle of an object directly based on the captured image) and the optical encoder 200 (which determines the position or angle of an object based on the phase differences between the waveforms converted from the captured image) in accordance with some embodiments of the present disclosure. In FIG. 4B, a curve L1' shows the simulation result of the optical encoder 200 while another curve L2' shows the simulation result of the existing absolute encoder. As shown in FIG. 4B, when the variance of Gaussian noise (e.g., noise level) increases from 0 to 0.06, the accuracy of the optical encoder 200 remains at 100% but the accuracy of the existing absolute encoder drops to 99.54%. According to FIG. 4A and FIG. 4B, using the optical encoder 200 as shown in FIG. 2A would increase the accuracy of the position, motion or angle detected by the optical encoder 200.

Figure 5:
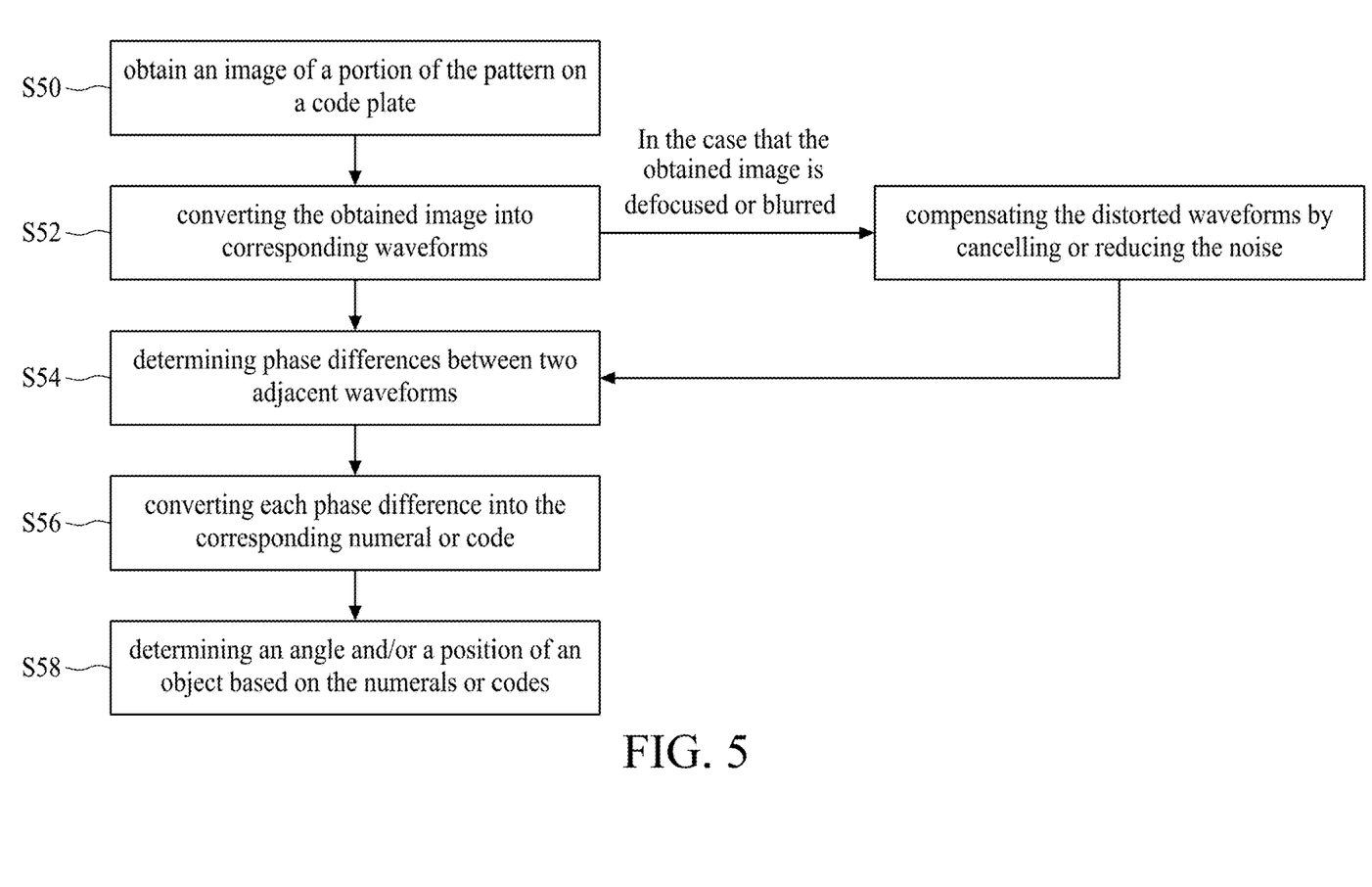
FIG. 5 illustrates a method for operating an optical encoder in accordance with some embodiments of the present disclosure.

FIG. 5 illustrates a flow chart of a method for operating an optical encoder in accordance with some embodiments of the present disclosure. In some embodiments, the method in FIG. 5 is used to operate the optical encoder 200 as shown in FIG. 2A. Alternatively, the method in FIG. 5 can be used to operate any other optical encoders to determine the angle or position of an object.

Referring to operation S50, an image of a portion of the pattern on a code plate (e.g., the disc 210 in FIG. 2A) is obtained by, for example, the sensor 220 in FIG. 2A. In some embodiments, the obtained image (e.g., the image illustrated in FIG. 2B) can be transmitted to the processor 230 for the subsequent processes.

Referring to operation S52, the obtained image is converted into corresponding waveforms. For example, the four sets of codes P1, P2, P3 and P4 in FIG. 2B can be converted into the corresponding waveforms W1, W2, W3 and W4 (e.g., sine waves or cosine waves) in FIG. 3A. In some embodiments, the transformation is carried out using, for example, FFT or any other suitable algorithm.

In some embodiments, in the event that a defocused or blurred image is captured, the corresponding converted waveforms would be distorted (as shown in FIG. 3B) due to the noise. In that case, operation S53 may be carried out to compensate the distorted waveforms W1', W2', W3' and W4' in FIG. 3B to become the waveforms W1, W2, W3 and W4 in FIG. 3A by canceling or reducing the noise of each waveform.

Referring to operation S54, the phase differences between two adjacent waveforms are determined. For example, as shown in FIG. 3A, the phase differences $\varphi 12$, $\varphi 23$ and $\varphi 34$ between two adjacent waveforms (e.g., "W1 and W2," "W2 and W3" and "W3 and W4") are determined by, for example, the processor 230.

Referring to operation S56, the phase differences are converted into a series of numerals or any other kinds of codes. In some embodiments, each phase difference can be converted into a corresponding numeral based on the following equation: $N=P/45$, where P is the phase difference and N is the corresponding numeral. For example, as shown in FIG. 3A, the phase differences $\varphi 12$, $\varphi 23$ and $\varphi 34$ (which are 45 degrees, 135 degrees and 315 degrees respectively) can be converted into the numerals "1," "3" and "7" (or the numeral "137"). In other embodiments, a phase difference can be converted into a corresponding numeral based on the following equation: $N=P/M$, where P is the phase difference, N is the corresponding numeral and M is an integer greater than 0 depending on different design requirements.

Referring to operation S58, the angle and/or position of an object connected to the optical encoder are determined based on the numerals (or codes) by, for example, referring to a conversion table, which records information regarding a series of numerals or codes and the corresponding angle and/or position of the object.

In other embodiments, phase information (e.g., the absolute phase) of the waveforms W1, W2, W3 and W4 can be directly converted into a series of numerals or any other kinds of codes, and then the angle and/or position of the object connected to the optical encoder are determined based on the numerals (or codes) by, for example, referring to a conversion table.

In accordance with the embodiments in FIG. 5, by converting the obtained image into a series of waveforms and determining the position, motion and/or angle of the rotatable mechanism based on the phase differences between the waveforms, the aberration or distortion (e.g., defocus or blurring) of captured images has less influence on the determination of the position, motion and/or angle of the object, which would increase the accuracy of the position, motion or angle detected by the optical encoder without increasing the number of pixels or resolution of the code plate.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same or equal if the difference between the values is less than or equal to ±10% of the average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An encoder comprising:
    a plate including a pattern thereon, the pattern including a first set of codes and a second set of codes, the first set of codes associated with a first waveform, and the second set of codes associated with a second waveform;
    a sensor configured to obtain an image of a portion of the pattern; and
    a processor configured to convert the image obtained by the sensor into at least the first and the second waveforms.

2. The encoder of claim 1, wherein the processor is further configured to determine phase information of the waveforms.

3. The encoder of claim 2, wherein the processor is further configured to convert the phase information into a numeral or a code.

4. The encoder of claim 1, wherein the processor is further configured to determine a phase difference between two adjacent waveforms.

5. The encoder of claim 4, wherein the processor is further configured to convert the phase difference into a numeral or a code.

6. The encoder of claim 5, wherein the processor is further configured to determine a position of the object based on the numeral or the code.

7. The encoder of claim 6, wherein the phase difference is converted into the numeral based on the following equation: N=P/M, where P is the phase difference, N is the numeral corresponding to the phase difference, and M is an integer greater than 0.

8. The encoder of claim 7, wherein the obtained image includes at least the first and the second sets of codes, and each set of codes is respectively converted into the first waveform and the second waveform.

9. The encoder of claim 7, wherein the image obtained by the sensor is converted into the waveforms by Fast Fourier Transform (FFT).

10. The encoder of claim 7, wherein the processor is further configured to cancel noise present in the waveforms.

11. The encoder of claim 7, wherein the waveforms are in the form of a sine wave or a cosine wave.

12. A method for determining a position of an object, the method comprising:
    (a) obtaining an image on a code plate connected to the object, the plate including a pattern thereon, the pattern including a first set of codes and a second set of codes, the first set of codes associated with a first waveform, and the second set of codes associated with a second waveform;
    (b) converting the image obtained by the sensor into at least the first and the second waveforms;
    (c) determining phase information of the waveforms; and
    (d) determining the position of the object based on the phase information.

13. The method of claim 12, further comprising converting the phase information into a numeral or a code.

14. The method of claim 13, further comprising determining the position of the object based on the numeral or the code.

15. The method of claim 12, further comprising determining a phase difference between two adjacent waveforms and converting the phase difference into a numeral or a code.

16. The method of claim 15, further comprising determining the position of the object based on the numeral or the code.

17. The method of claim 16, wherein the phase difference is converted into a numeral based on the following equation: N=P/M, where P is the phase difference, N is the numeral corresponding to the phase difference, and M is an integer greater than 0.

18. The method of claim 12, wherein the obtained image includes at least the first and the second sets of codes, and each set of codes is respectively converted into the first waveform and the second waveform.

19. The method of claim 12, operation (b) is carried out using Fast Fourier Transform (FFT).

20. The method of claim 12, further comprising cancelling noise present in the waveforms.

21. The method of claim 12, wherein the waveforms are in the form of a sine wave or a cosine wave.

\* \* \* \* \*